Aug. 27, 1968 RYOICHIRO OSHIMA ET AL 3,398,765
BENT PIPE WAY HAVING IMPROVED FLOW CHARACTERISTICS
Filed Jan. 14, 1964 2 Sheets-Sheet 2

INVENTORS
RYOICHIRO OSHIMA
KEIICHI HANAWADA

BY Paul M. Craig, Jr.
ATTORNEY

United States Patent Office 3,398,765
Patented Aug. 27, 1968

3,398,765
BENT PIPE WAY HAVING IMPROVED FLOW CHARACTERISTICS
Ryoichiro Oshima and Keiichi Hanawada, Hitachi-shi, Japan, assignors to Hitachi, Ltd., Tokyo, Japan, a corporation of Japan
Filed Jan. 14, 1964, Ser. No. 337,570
Claims priority, application Japan, Jan. 18, 1963, 38/1,461
4 Claims. (Cl. 138—39)

To control the flow of fluid in plants handling fluid, a flow metering device employing a differential pressure flow meter is generally used.

The present invention relates to a flow metering arrangement in which a pipe way for fluid to be metered, especially the pipe way portion that is upstream from the pressure difference detecting portion is of a special structure. In flow metering arrangements employing the pressure differential principle, it is important that the flowing condition of fluid to be metered be non-turbulent or laminar in nature. In other words, such a non-turbulent flowing condition as has symmetrical flowing velocity distribution against the pipe axis and has no circumferential velocity components, is required. If such a non-turbulent flowing condition cannot be kept, it is impossible to get accurate measured values. In conventional differential pressure flow metering arrangements, straight pipes of considerable length are employed before and behind the pressure difference detecting portion to fill such a condition as far as possible.

In such case, however, the length of the up-stream straight pipe that precedes the pressure difference detecting portion, is required to be more than 30 times as long as the pipe diameter. The employment of such a long pipe necessarily badly influences the structure or design of the piping system of the plant in which the flow metering device is to be installed, and results in wasteful use of pipe ways, uneconomic installation costs and undue complexity.

The present invention, devised with the intention of improving this situation, provides a flow regulating device which is simple in structure, free from said fault and yet can enhance account measurement of flow.

The results of the experimental research made for the purpose stated above will be mentioned in the following description with reference to the accompanying drawings showing an embodiment of the invention, wherein—

Figure 1:
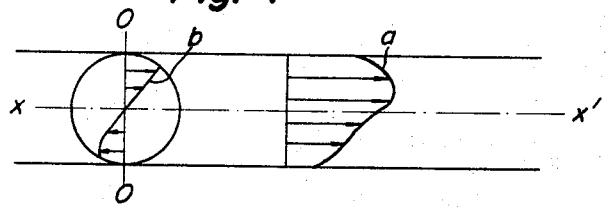
FIG. 1 is a flowing velocity distribution diagram of a conventional pipe way portion which immediately follows a bent pipe way portion.

FIG. 1 shows the flowing velocity distribution around an approach length 10D down-stream from a bent pipe in the case where a conventional bent pipe is put in the pipe way. As the diagram shows, the flowing velocity distribution around approach length 10D down-stream from the bent pipe is unsymmetrical with respect to the pipe axis $x$–$x'$. Furthermore, there is generated a secondary flow with radial or circumferential velocity components, as indicated by reference symbol $b$.

Figure 2:
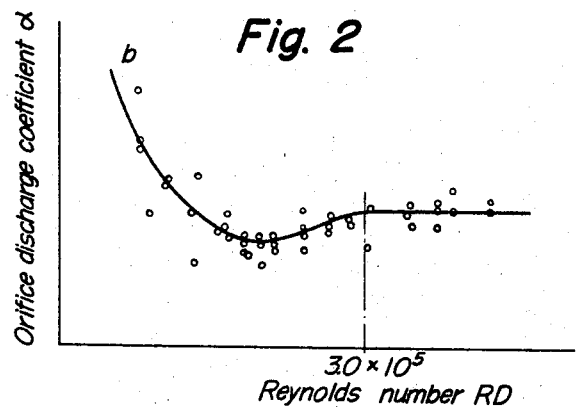
FIG. 2 is a diagram showing the relation between the Reynolds number and orifice coefficient of the conventional pipe way.
Figure 3:
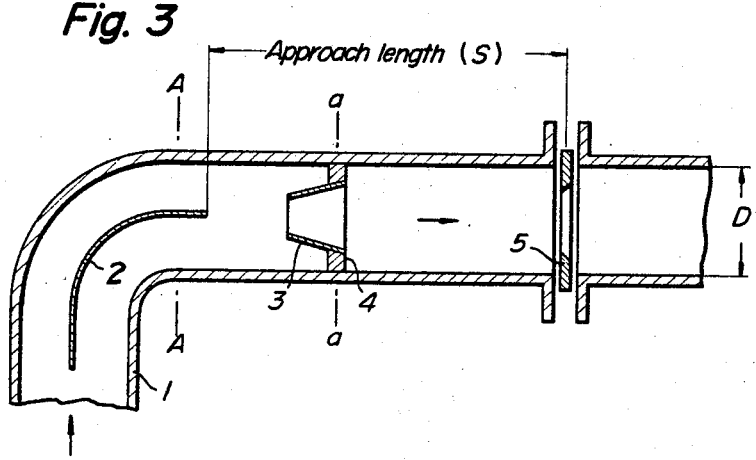
FIG. 3 is a longitudinal sectional view of an improved bent pipe way embodying the present invention.
Figure 4:
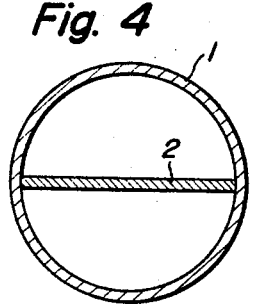
FIG. 4 is a cross sectional view of the same taken on the line A–A'.
Figure 5:
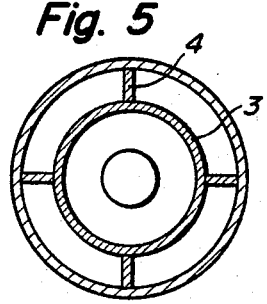
FIG. 5 is a cross sectional view of the same taken on the line a–a' of FIG. 3.

Accordingly, as shown in FIG. 2, the discharge coefficient of an orifice fitted at short approach lengths downstream from a bent pipe widely varies with the measuring points around Reynolds number $RD=3.0 \times 10^5$ and below. This actual measurement proves that accurate measured values cannot be obtained immediately following a conventional bent pipe way. To overcome this problem the present invention has provided a new and improved bent pipe way structure so as to improve flow conditions in the down-stream pipe way portion from the bent pipe. As indicated in FIGS. 3, 4 and 5, a guide plate 2 is fitted in the bent pipe to destroy the twisting flow $b$. The guide plate 2 is situated on a diameter of the pipe so as to divide it into upper and lower channels having semi-circular shaped cross-sections as shown in FIGURE 4. In addition to that, a tapered pipe 3 is fitted in the down-stream end of the bent pipe portion, and is disposed a slight distance from the end of guide plate 2. The tapered pipe 3, to which support blades 4 are fitted on the circumference of the lower opening, and the guide plate 2 effectively work to destroy the influence on the flow given by the bent pipe etc.

Figure 6:
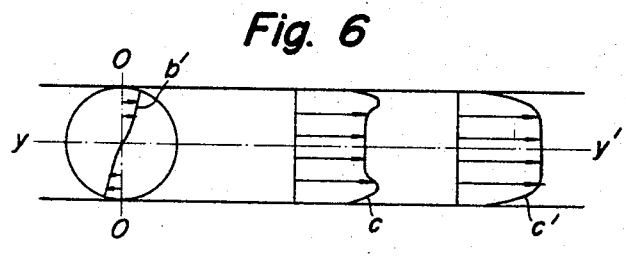
FIG. 6 is a flowing velocity distribution diagram of the pipe way of this invention.

With the device of the present invention, the flowing velocity distribution in the down-stream pipe way from the starting point of the short approach portion is as shown in FIG. 6. Namely, symbol C indicates the flowing velocity distribution around the lower opening of the tapered pipe 3. This is due to the throttling effect of the outer surface of the tapered pipe and the inner surface of the pipe way which increases the flowing velocity of fluid near the inner surface of the pipe way. On the other hand, around an orifice 5 fitted down-stream from the tapered pipe 3, the flowing velocity of fluid near the pipe wall is reduced owing to the friction resistance of the inner surface of the pipe wall. Accordingly, the flowing velocity distribution becomes substantially symmetrical against the pipe axis $y$–$y'$ as indicated by C' in FIG. 6. Further, by a comparison of $b'$ in FIG. 6 to $b$ in FIGURE 1 it can be appreciated that radial or circumferential velocity components are reduced.

Figure 7:
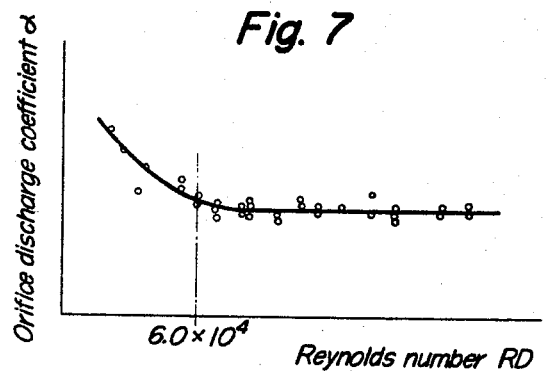
FIG. 7 is a diagram showing the relation between the Reynolds number and orifice discharge coefficient of the pipe way of this invention.

Thanks to the flow regulating effect stated above the discharge coefficient of the flow metering device with an orifice 5 fitted at the end of the short approach length (S) is flat as far as Reynolds number $RD=6.0 \times 10^4$ as shown in FIG. 7. As the result, the measuring accuracy of the metering device proves to be better than that of the conventional device.

Consequently, when this invention is employed in a flow metering device, far more accurate measured values can be obtained, even if the length between the bent pipe and the pressure difference detecting portion is considerably cut short.

Accordingly, it is no longer necessary to prepare a long approach pipe way portion to fit a differential pressure flow meter down-stream from a bent pipe, thereby removing this restriction on the design of plants and piping systems wherein it is desired to use differential pressure flow measuring devices.

Having described one embodiment of a bent pipe way having improved flow characteristics constructed in accordance with the invention it is believed obvious that other modifications and variations of the invention are possible in the light of the above teachings. It is therefor to be understood that changes may be made in the particular embodiment of the invention described which are within the full intended scope of the invention as defined by the appended claims.

What is claimed is:

1. A flow improvement device which comprises;

(a) a pipe way, with a bend therein (b) a pressure difference device for flow metering located within said pipe way and downstream from said bend (c) a guide plate secured in the bend in said pipe way and extending completely across a diameter of said pipe way for reducing the circumferential velocity components of a fluid flowing in said pipe way; and (d) an open ended frusto-conical element substantially concentrically mounted within said pipe way and located downstream from said bend and upstream from said pressure difference device with the large end thereof directed downstream for increasing the flow velocity of the fluid stream around the outer surface of the pipe way.

2. A flow improvement device according to claim 1 wherein said frusto-conical element is mounted on a set of circumferentially spaced radially extending vanes secured to the inner surface of said pipe way.

3. The pipe way according to claim 1 wherein said pressure difference device comprises an orifice mounted downstream from the frusto-conical element.

4. A flow improvement device according to claim 3 wherein said frusto-conical element is mounted on a set of circumferentially spaced radially extending vanes secured to the inner surface of said pipe way.

References Cited

UNITED STATES PATENTS

| | | | |
|---|---|---|---|
| 2,929,248 | 3/1960 | Sprenkle | 138—37 X |
| 1,827,727 | 10/1931 | Blizard | 138—37 |
| 1,940,790 | 12/1933 | Diehl | 138—44 |
| 2,143,477 | 1/1939 | Dillon et al. | 138—39 |
| 3,075,559 | 1/1963 | Sharp et al. | 138—37 |
| 3,185,181 | 5/1965 | Demyan | 138—37 |

FOREIGN PATENTS 934,933   11/1955   Germany.

LAVERNE D. GEIGER, *Primary Examiner.*

B. E. KILE, *Assistant Examiner.*